United States Patent
Dennis et al.

[11] 3,713,944
[45] Jan. 30, 1973

[54] METHOD OF MANUFACTURE OF PRINTED CIRCUITS BY DIE STAMPING

[75] Inventors: Herman W. Dennis, Harper Woods; Arnold Birko, Dearborn Heights, both of Mich.

[73] Assignee: Essex International, Inc.

[22] Filed: May 28, 1970

[21] Appl. No.: 41,376

[52] U.S. Cl. .................................. 156/261, 156/516
[51] Int. Cl. .................................................. B32b 31/18
[58] Field of Search............... 156/306, 516, 510, 261

[56] References Cited

UNITED STATES PATENTS

| 3,547,724 | 12/1970 | Zagusta | 156/233 |
| 2,969,300 | 1/1961 | Franz | 156/516 X |
| 3,497,410 | 2/1970 | Zagusta et al. | 156/233 |

FOREIGN PATENTS OR APPLICATIONS

| 4,175 | 2/1879 | Germany | 83/590 |

Primary Examiner—Benjamin A. Borchelt
Assistant Examiner—D. A. Bent
Attorney—Learman & Mc Culloch

[57] ABSTRACT

The manufacture of a printed circuit comprises arranging an adhesive-free, electrically conductive sheet in overlying relation with a non-conductive backing sheet coated with a dry, thermoplastic adhesive. A heated die having contours conforming generally to the configuration of conductive circuit elements to be bonded to the backing engages the conductive sheet and fuses the circuit elements to the backing sheet. The overlying sheets then are indexed to a cutting station at which the sheets are supported on a hard, flat base and a cutting die having cutting edges corresponding to the marginal outlines of the circuit elements is dropped onto the overlying sheets to cut the circuit elements from the conductive sheet. The cutting edges of the cutting die project from the lands they surround a distance greater than the thickness of the conductive sheet, but less than the combined thickness of the conductive sheet, the backing sheet, and the adhesive coating so that the backing sheet is neither cut nor permanently deformed. Following the cutting operation the conductive sheet from which the circuit elements have been cut is removed and an overlay sheet of insulation is applied over the circuit elements and bonded to the latter and to the backing sheet.

14 Claims, 9 Drawing Figures

PATENTED JAN 30 1973
3,713,944
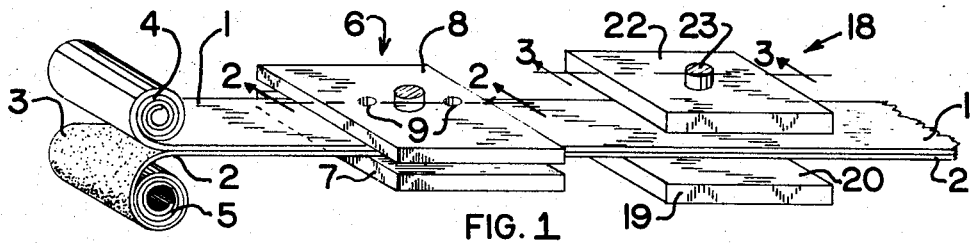
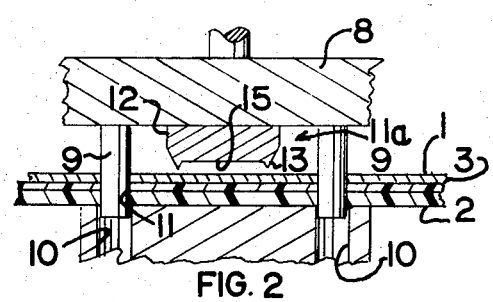
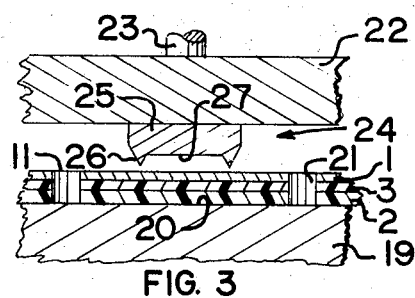
FIG. 2    FIG. 3
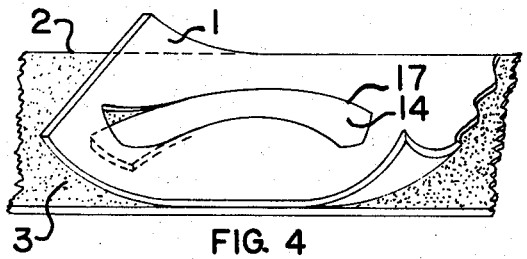
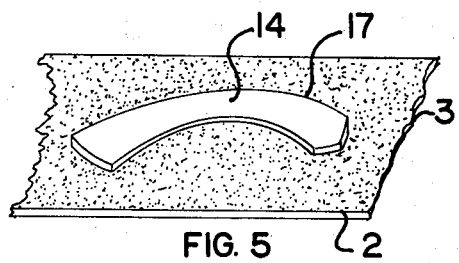
FIG. 4    FIG. 5
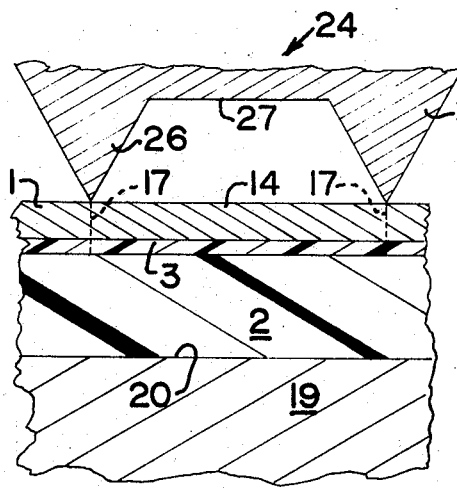
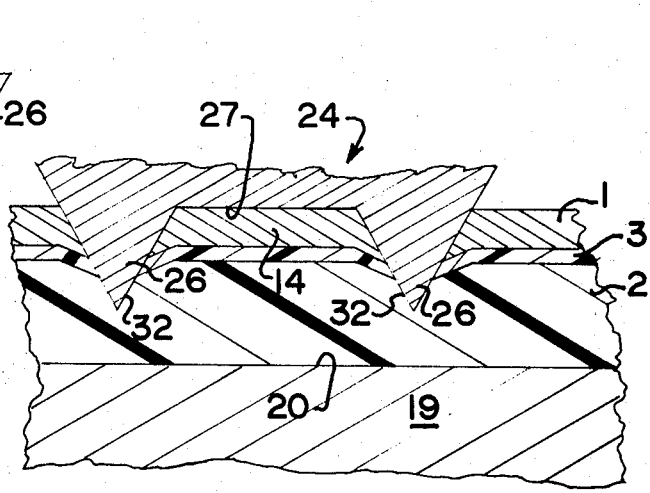
FIG. 6    FIG. 7
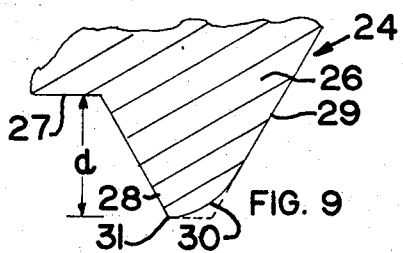
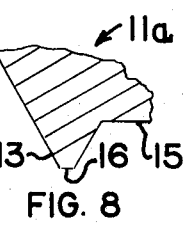
FIG. 9    FIG. 8
INVENTORS
HERMAN W. DENNIS
ARNOLD BIRKO
BY
*Leaman McCulloch*

A METHOD OF MANUFACTURE OF PRINTED CIRCUITS BY DIE STAMPING

The invention disclosed herein relates to apparatus and methods for manufacturing printed circuits and more particularly to the manufacture of flexible printed circuits wherein a flexible, non-conductive sheet is provided on at least one side thereof with conductive circuit strips or elements arranged in a predetermined pattern.

The manufacture of printed circuits by die stamping techniques is well known, but the apparatus and methods in use heretofore result in certain disadvantages. For example, prior art processes utilize a base on which superposed adhesively bonded sheets of backing material and conductive material are supported so as to enable a cutting die to cut the conductive circuit elements from the conductive sheet. The cutting die conventionally has cutting edges which project from the land areas they surround a distance greater than the combined thickness of the superposed sheets. To avoid cutting of the backing sheet, the supporting base has grooves in register with the die's cutting edges and into which the backing sheet is swaged during the die cutting operation. In such a process both the conductive material and the non-conductive backing sheet are stretched. Following the cutting operation, the stretched portions of the backing sheet recover and, in so doing, the marginal edges of the conductive circuit strips become beaded or somewhat thicker than those portions of the conductive strips between their marginal edges. In the subsequent handling of printed circuits having beaded conductive strips it is not uncommon for the beaded portions of the strips to become torn or split, thereby affecting adversely the electrical integrity of the printed circuit.

Another disadvantage of known processes for manufacturing printed circuits is that the conductive sheet is coated on one side with the adhesive by means of which the conductive circuit strips are bonded to the non-conductive backing sheet. The conductive sheet usually constitutes an expensive metal foil of which a substantial amount remains as scrap following the cutting therefrom of the circuit strips. To reclaim the scrap portions of the conductive material it is necessary that such material first be subjected to a process by means of which the adhesive is removed. The necessity of subjecting the conductive material to such a process increases the time and cost involved in manufacturing printed circuits.

An object of this invention is to provide apparatus and methods for manufacturing printed circuits and which overcome the disadvantages referred to above.

Another object of the invention is to provide apparatus and methods for the manufacture of printed circuits and which enable printed circuits to be manufactured more rapidly and economically than has been possible heretofore.

A further object of the invention is to provide printed circuit manufacturing apparatus wherein stretching or flowing of the printed circuit backing material is minimized, thereby resulting in more precise cutting of the conductive circuit strips and virtually eliminating any beading of the marginal edges thereof.

Other objects and advantages of the invention will be pointed out specifically or will become apparent from the following description when it is considered in conjunction with the appended claims and the accompanying drawing, wherein:

FIG. 1 is a diagrammatic, isometric view illustrating the process of manufacturing printed circuits according to the invention;

FIG. 2 is an enlarged, transverse sectional view taken on the line 2—2 of FIG. 1;

FIG. 3 is an enlarged, transverse sectional view taken on the line 3—3 of FIG. 1;

FIG. 4 is an isometric view illustrating the backing sheet and the overlying conductive sheet, the latter having had a conductive strip cut therefrom and in the process of being removed from the backing sheet;

FIG. 5 is a view similar to FIG. 4, but illustrating the conductive strip on the backing sheet following removal of the conductive sheet;

FIG. 6 is a greatly enlarged sectional view of a cutting die constructed according to the invention in a position of initial cutting engagement with the conductive sheet;

FIG. 7 is a view similar to FIG. 6, but illustrating the final stage of cutting of a conductive strip from the conductive sheet;

FIG. 8 is a greatly enlarged view of one portion of a heated bonding die; and

FIG. 9 is a greatly enlarged view of one portion of the cutting die.

Printed circuits formed in accordance with the invention may be manufactured from a sheet 1 of electrically conductive material such as copper foil arranged in overlying relation with a sheet 2 of non-conductive material such as the polyester known as Mylar, the surface of the sheet 2 which confronts the sheet 1 preferably having a known thermoplastic resin adhesive 3 thereon which is dry and non-tacky until heated to a predetermined temperature. The sheets 1 and 2 may be withdrawn from supply rolls 4 and 5, respectively. Any conventional means for unwinding and advancing the sheets 1 and 2 from their supply rolls may be employed.

The sheets 1 and 2, in superposed relation, are presented to a bonding station 6 at which are mounted a support 7 and a vertically adjustable platen 8, the platen carrying punches 9 aligned with openings 10 in the base 7 so as to enable locating holes 11 to be punched in the sheets 1 and 2. The platen 8 is moved vertically by any conventional means.

Fixed to the lower surface of the platen 8 is a bonding die 11a having a body 12 provided on its lower surface with projecting ribs 13 adapted to engage the conductive sheet 1. The function of the bonding die is to bond selected areas or strips, one of which is shown at 14, of the sheet 1 to the sheet 2 via the adhesive 3. The temperature of the die 11a, therefore, should be sufficient to plasticize the adhesive 3, and the die may be heated to the appropriate temperature by electrical or any other conventional means.

The ribs 13 illustrated in the drawing are spaced apart and continuous so as to conform to the outline of an area or strip 14 that is to be cut from the conductive sheet 1. The continuous ribs 13 enclose a land 15 which does not engage the sheet 1. The ribs need not be formed in this manner, however. Instead, there could be one rib for each such strip 14 and such strip would have a configuration similar to the configuration of the strip. In any case, the lower surfaces of the ribs 13 preferably are flat, as is indicated at 16.

An important characteristic of the invention is that the heating of the sheet 1 occurs only at those portions of the latter corresponding to the locations of the strips 14, and preferably the engagement of the sheet 1 by the ribs 13 is confined to an area wholly inwardly of the marginal edges, indicated by the reference character 17, of such strips. As a consequence, plasticizing of the adhesive 3 beyond the marginal edges of the strips 14 may be prevented. Ribs such as those disclosed in FIGS. 2 and 8 do not necessarily bond the entire area of the strip 14 to the backing sheet 2, but may effect bonding of the strip adjacent its marginal edges.

From the bonding station 6 the sheets 1 and 2 are indexed by any conventional means to a cutting station 18 at which the sheets are supported on a base 19 having an upper surface 20 which is flat except for locating pins 21 which are accommodated in the prepunched locating openings 11 of the sheets 1 and 2. The base 19 is formed of an extremely tough, incompressible material, but one which is capable of being machined easily so as to permit the surface 20 to be shaped as desired. Although there are many materials from which the base 19 can be made, polyphenylene oxide is suitable.

Supported above the base 19 is a vertically movable head 22 which forms part of a drop hammer machine of known construction. The head 22 may be moved upwardly to a predetermined height and then released, whereupon it will drop by gravity toward the base 19. The means for lifting the head 22 is represented by an upstanding post 23.

Carried by the head 22 is a cutting die 24 comprising a body 25 having on its lower surface continuous ribs 26 which surround and project a distance $d$ beyond a land 27. The configuration of the ribs 26 corresponds to the configuration of the strip 14 which is to be cut from the conductive sheet 1.

Each rib 26 has an inner side 28 and an outer side 29 which converge downwardly and form an included angle therebetween of substantially 60°. Rather than converging to a point, however, the free end of the outer side 29 is broken away or rounded as at 30, thereby making it possible for the free end of the inner side 28 to terminate in a sharp cutting edge 31, as shown in FIG. 9. The cutting edge 31 is adapted to engage the sheet 1 along the edges 17 of the strip 14 that is to be cut from the sheet 1, as is illustrated in FIG. 6.

The vertical distance $d$ between the sharp cutting edge 31 of the ribs 26 and the surface of the land 27 is a critical dimension in the sense that such distance must be greater than the thickness of the sheet 1, but less than the combined thickness of the sheets 1 and 2 and the adhesive 3. Preferably, the distance $d$ is less than the thickness of the sheet 2. For example, if the thickness of the sheet 1 is 0.0014 inch and the thickness of the sheet 2 is 0.005 inch, and the combined thickness of the sheets 1 and 2 and the adhesive 3 is 0.0070–0.0075 inch, then the distance $d$ from the sharp cutting edge 31 to the surface of the 1 and 27 preferably is 0.003 to 0.004 inch.

At the cutting station 18 the overlying sheets 1 and 2 are oriented relatively to the cutting die 24 by means of the locating pins 21 so that the edges 17 of the strip 14 to be formed lie directly below the sharp cutting edges 31 of the body 25. The head 22 then is permitted to drop, whereupon the edges 31 will engage the sheet 1. The inertia of the head 22 will enable the cutting edges 31 to penetrate the sheet 1 so as to sever the strip 14 therefrom. The die 24 is a cold or unheated die and does not plasticize the adhesive 3. Since the die 24 is cold and since the previously plasticized adhesive is inwardly of the strip's edges 17, the cutting edges 31 at no time contact tacky adhesive and thus remain clean.

As the head 22 moves downwardly, the ribs 26 of the body 25 will indent the non-conductive sheet 2, as is indicated in great exaggeration at 32 in FIG. 7, but shortly after engagement of the sheet 1 by the cutting edges, the land 27 between the ribs 26 will engage the upper surface of the sheet 1, or more accurately the severed strip 14, and halt further downward movement of the die 25. At this time the head 22, together with the body 25, is moved vertically upwardly whereupon the indented portions 32 of the conductive sheet 2 will begin to recover so as once again to assume a flat surface. In the recovery of the deformed portions 32 of the sheet 2, the marginal edges of the strip 14 remain flat inasmuch as the flat surface of the base 19, coupled with the short distance $d$ between the cutting edges 31 and the land 27, prevents substantial deformation of the sheet 2.

Following the cutting of the strip 14 from the sheet 1, the unbonded portion of the sheet 1 may be stripped from the sheet 2 in any conventional manner as is indicated in FIG. 4 so as to expose the entire upper surface of the sheet 2 except for that portion of the surface which is covered by the strip 14. See FIG. 5. Thereafter, the sheet 2 and the adhered strip 14 may be covered by a suitable overlay film or sheet (not shown) of conventional dielectric material which may be bonded to the upper surface of the sheet 2, as well as to the strip 14, to form a finished printed circuit. The adhesive 3 on the upper surface of the sheet 2 facilitates the bonding of the dielectric overlay in the making of the finished product.

The cutting die 24 preferably is extremely hard material, such as air- or oil-hardening steel, tempered to a hardness of 47 to 48 on the Rockwell C scale. The land surface 27 may be formed by an electro-discharge or carbide tool machining operation or, if desired, the land area 27 may be built up from any suitable incompressible material.

Setting up of the disclosed apparatus for the manufacture of printed circuits involves the consideration of several factors such as the mass of the head 22 and the parts carried thereby, the velocity of the head at the time of impact of the cutting die 24 with the sheet 1, the materials from which the sheets are formed, their thicknesses and physical properties, and the areas of the cutting edges and the land 27. For proper operation, the sheet 1 must be cut to form one or more strips 14, but the sheet 2 must not be cut. The energy available for expenditure during a cutting stroke of the head 22, therefore, must be selected to produce these results. For a given form or shape of the cutting die 24, the total area of the cutting edges 31 and the total area of the land 27 may be calculated, and for given thickness materials constituting the sheets 1 and 2 their physical properties such as tensile strengths, elastic moduli, and elongation limits will be known. When such factors are known, it is possible to calculate the impact velocity that the head 22 must have to effect shearing of the sheet 1 without shearing of the sheet 2.

The impact velocity of the head 22 is directly related to the mass of the head and the parts carried thereby and the distance the head is permitted to drop prior to engagement of the cutting die with the conductive sheet. Since both the mass and the distance can be adjusted quite easily, the impact velocity can be adjusted precisely.

In a typical cutting stroke of the head 22, initial engagement of the cutting edges 31 of the die 24 with the sheet 1 causes the latter to be stretched on both sides of each cutting edge. If the sheet 1 is copper its elastic limit is reached after about 40 to 45 percent extension, whereupon the copper separates at the line of the edge 31. A substantial part of the available kinetic energy of the moving die is expended in the embedding of the ribs 26 in the sheets 1 and 2 an amount sufficient to effect cutting of the sheet 1. As the ribs continue to press into the layers 1 and 2, the resistance to such movement of the die increases due to the increasing compression and displacement of the sheet 2. When the land 27 of the die engages the upper surface of the laminated sheets 1 and 2, the resistance to further downward movement of the die increases sharply inasmuch as the area of the land 27 is many times that of the edges 31. The remaining kinetic energy of the die thus is expended in compression of the laminated sheets by the land 27 and by the ribs 26. By selecting the mass of the head 22 and its initial distance above the laminated sheets in such manner that the total kinetic energy available at impact is less than that required to cut both of the sheets 1 and 2, cutting of the sheet 2 is prevented.

The disclosed methods and apparatus are representative of presently preferred forms thereof, but are intended to be illustrative rather than definitive of the invention. The invention is defined in the claims.

We claim:

1. A method of making a printed circuit having a non-conductive member which carries at least one conductive strip having a predetermined configuration, said method comprising arranging a sheet of electrically conductive material and a sheet of non-conductive material in overlying relation and with a layer of thermally sensitive adhesive between said sheets; compressing said sheets between a base and a bonding die having a configuration corresponding to the configuration of the strip to be carried by said non-conductive member and under sufficient heat and pressure to plasticize the adhesive beneath said die and bond to said non-conductive sheet a portion of said conductive sheet corresponding to the configuration of said bonding die; cutting said conductive sheet along the outer marginal edge of said bonded portion thereof to sever from said conductive sheet a strip having a configuration corresponding to the configuration of said bonded portion; and stripping the remaining portion of said conductive sheet from said non-conductive sheet.

2. The method set forth in claim 1 wherein said portion is adhered to said non-conductive sheet adjacent the marginal edges only of said portion.

3. The method set forth in claim 1 wherein said portion is cut from said conductive sheet by dropping a cutting die onto said conductive sheet, said die having a body provided with cutting edges protruding from said body and shaped according to the configuration of said strip.

4. The method set forth in claim 3 including limiting movement of said cutting die in a direction through said sheets by engagement of the body of said die with said conductive sheet.

5. The method set forth in claim 1 wherein said adhesive is applied to and carried by said non-conductive sheet only.

6. The method set forth in claim 1 wherein said adhesive is dry and non-tacky until heated to a predetermined temperature.

7. The method set forth in claim 1 wherein said conductive sheet is cut by dropping onto said conductive sheet a cutting die body having cutting edges at its perimeter conforming to the outline of said bonded portion, said cutting edges having a height greater than the thickness of said conductive sheet but less than the combined thickness of said conductive sheet and said non-conductive sheet.

8. The method set forth in claim 7 wherein said overlying sheets are supported on a flat, non-yielding surface during the cutting of said conductive sheet.

9. The method set forth in claim 7 wherein said cutting die body is dropped from a height above said conductive sheet such that the impact velocity of said body is sufficient to shear said conductive strip but is insufficient to shear said non-conductive sheet.

10. The method set forth in claim 7 wherein that portion of said die body inwardly of its cutting edges is flat and wherein the area of said flat portion of said body is sufficient to arrest movement of said body following cutting said conductive sheet.

11. A method of making a printed circuit from a sheet of conductive material supported on a sheet of non-conductive material, said method comprising dropping by gravity onto said conductive sheet cutting die means having cutting edges conforming to the shape of a strip to be cut from said conductive sheet, the mass of said die means and its initial height above said conductive sheet being such that the velocity of said die means upon impact with said conductive sheet is sufficient to cut said strip from said conductive sheet but insufficient to cut said non-conductive sheet; and stripping the remaining portion of said conductive sheet from said non-conductive sheet.

12. The method set forth in claim 11 including supporting said sheets beneath said die means on a non-yieldable, flat surface.

13. The method set forth in claim 11 including bonding to said non-conductive sheet a portion of said conductive sheet having a configuration corresponding to the configuration corresponding to the configuration of said strip, the bonding of said portion of said conductive strip preceding the cutting of said conductive strip.

14. The method set forth in claim 13 wherein the bonding of said portion of said conductive strip is effected by the application of heat and pressure to said portion of said conductive strip.

* * * * *